UNITED STATES PATENT OFFICE.

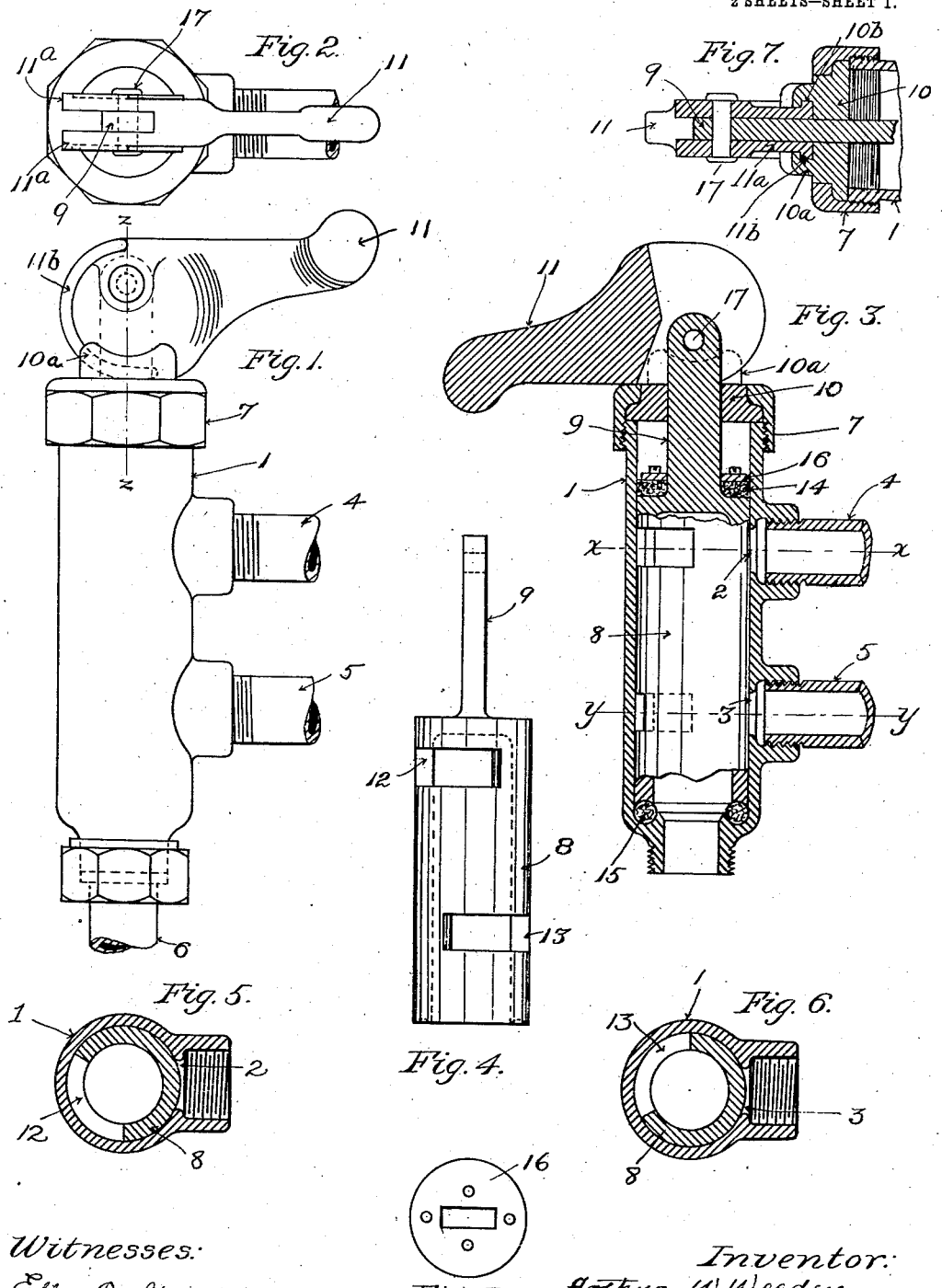

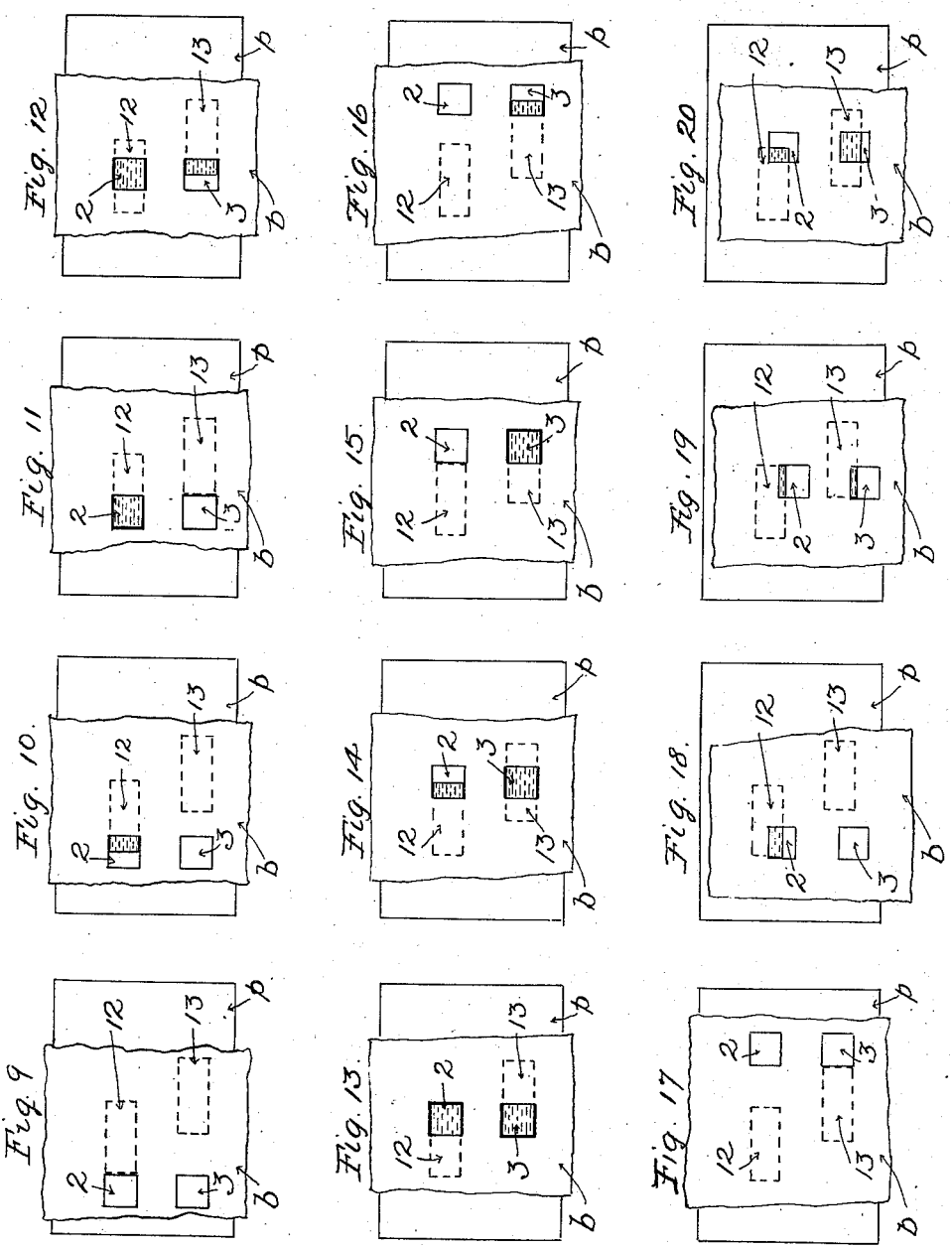

ARTHUR W. WEEDEN, OF SOMERVILLE, MASSACHUSETTS.

VALVE FOR INTERMINGLING AND CONTROLLING FLUIDS.

1,016,382.   Specification of Letters Patent.   Patented Feb. 6, 1912.

Application filed November 21, 1910. Serial No. 593,468.

*To all whom it may concern:*

Be it known that I, ARTHUR W. WEEDEN, citizen of the United States, residing at Somerville, in the county of Middlesex and State of Massachusetts, have invented certain new and useful Improvements in Valves for Intermingling and Controlling Fluids, of which the following is a specification.

This invention relates to certain improvements in valves or faucets, and has for its object to provide a valve of a simple and inexpensive nature adapted to receive a supply of fluid from two sources of supply of different characters or temperatures and to control in a simple and effective manner the amount and to regulate the proportion of the fluid received from each source of supply.

The nature and characteristic features of the invention will appear by reference to the accompanying description and drawings in illustration thereof which describes and shows my invention as embodied in a bath valve or faucet and the novel features of the invention will be hereinafter defined in the claims.

In the drawings,—Figure 1 represents an external view in side elevation of my invention, as embodied in a bath faucet. Fig. 2 is a plan view of the top of my valve or faucet illustrating more particularly the form and construction of the controlling lever or handle. Fig. 3 is a side elevation of my invention principally in section illustrating the interior arrangement thereof. Fig. 4 is an elevation showing the rotatable plug used in my invention detached from the valve or faucet. Figs. 5 and 6 are respectively sections taken on planes *x—x* and *y—y* in Fig. 3. Fig. 7 is a section taken in the plane *z—z*, in Fig. 1. Fig. 8 is a plan view showing the packing washer used in connection with my improved valve. Figs. 9 to 17 inclusive are a series of views representing the development of the interior surface of the valve body and the exterior surface of the valve plug, and showing the successive relations of the openings formed in the valve plug to the ports formed in the valve body as the valve plug is rotated for the purpose of controlling the flow of fluid through said valve. Figs. 18, 19 and 20 represent similar developed views showing the different relations of the plug openings and the valve inlet ports which are effected by a longitudinal movement of the plug in said valve body in combination with the rotative adjustment of the said plug.

Referring to said figures, 1 represents the body of my valve, comprising preferably a substantially cylindrical hollow shell having openings or inlet ports, 2 and 3, provided on one side and adapted, preferably by pipe threading, to receive the pipes 4 and 5, for example, adapted respectively to supply hot water and cold water. The lower end of said valve body forming the discharge outlet is preferably threaded and forms a part of a union for attaching the discharge pipe 6. The upper end of said body is preferably threaded to receive a cap 7, by which the plug and other parts hereinafter referred to are secured within the valve body.

Within the valve body, as shown in Fig. 3 is located the rotatable and preferably longitudinally movable plug 8, said plug being adapted to fit within said valve body in substantially leakage proof relation. The upper end of said plug is provided with a preferably flattened tongue 9 which extends through a central opening formed in a bushing 10 rotatably mounted in cap 7. A handle 11 is pivotally secured to the external end of said tongue 9, as will be hereinafter more particularly described, by which the valve may be rotated with respect to the faucet body or may be longitudinally shifted therein.

The rotatable plug 8 is hollow and, as more clearly shown in Figs. 3 and 4 is formed with laterally elongated plug openings 12 and 13 which are cut in and extend circumferentially partially around the plug. Said openings 12 and 13 respectively coöperate with the inlet ports 2 and 3, formed in the valve body and through which the supply pipes 4 and 5 are respectively adapted to discharge, in controlling and regulating the flow of liquid through the valve in a manner to be hereinafter more fully set forth. Said inlet ports 2 and 3 are preferably of rectangular form, and are of an area which permits an unobstructed flow to the full capacity of the supply pipes therethrough. The openings 12 and 13 in the plug are preferably of a width substantially equal to the height, or dimension longitudinally with respect to the valve body, of the inlet ports 2 and 3, and are located upon the plug in such longitudinal positions that normally the width of the plug openings exactly registers with the height of the inlet ports, and coincides therewith when superimposed thereon.

The elongation of the plug openings 12 and 13 and the relative circumferential positions of the same on the surface of the plug 8 are shown more clearly in Figs. 4, 5 and 6. Said plug openings 12 and 13 are circumferentially so placed upon the plug with respect to each other that one portion of each, for example, the right hand end of the opening 12 and the left hand end of the opening 13, as shown in Fig. 4, simultaneously register in maximum relation with their respective coöperating inlet ports so as to permit the maximum flow simultaneously through each in one of the positions of rotation of the plug in the valve body. From such simultaneously registering portions the plug openings are laterally elongated or extended in mutually opposite directions. One of said plug openings for example, 12, extends circumferentially around the surface of the plug 4 for a distance at least exceeding twice the circumferential length of its coöperating inlet port, toward the left as viewed in Fig. 4. The other plug opening 13 is elongated in a similar manner so as to extend circumferentially around the valve in the opposite direction, or toward the right, as viewed in Fig. 4. Packing rings may be provided if desired, as at 14 and 15, the former being secured around the neck 9 of the plug 8 by means of a washer 16.

The operation of my invention in controlling the flow of liquid to my valve is more clearly understood by the aid of the developed views shown in Figs. 9 to 20 inclusive. In said views like characters or figures are applied to like parts throughout. In said views the observer is assumed to be looking through the inlet ports formed in the valve body toward the plug, $b$ representing that portion of the internal surface of the valve body in which the ports 2 and 3 are located, while $p$ represents the developed surface of the plug having the plug openings 12 and 13 formed therein, said openings 12 and 13 being shown by dotted lines except as such openings register with the inlet ports. The effective areas through which the fluid supply is permitted to flow are indicated by shading. Referring to said Figs. 9 to 17 inclusive, the surface $p$ of the plug 8 is assumed to be in the process of rotation within the valve body $b$ by means of the controlling lever 11, and its surface $p$ to have reached, in Fig. 9, a position with respect to the body surface $b$ wherein the left end of plug opening 12 is approaching the edge of the inlet port 2. In such position neither valve opening 12 nor 13 in any place registers with either of the inlet ports 2 or 3, and consequently there will be no flow whatever of liquid through the valve. Upon further rotation of the plug until the plug surface $p$ and the body surface $b$ come into the relation shown in Fig. 10, the left hand end of plug opening 12 will come in registration with the port 2 for a portion of the width of the latter, and that portion of the area of the opening 12 and of the inlet port 2 which are in registration, such area being shown as shaded in the figure, will be effective to permit a somewhat restricted passage of fluid from the pipe 4 suplying hot water. In Fig. 11 a continued rotation of the plug within the valve body will swing inlet port 2 into registration, in maximum relation with the left hand end of the plug opening 12, and consequently an unrestricted flow of liquid will take place through the entire area of the inlet port 2. It is apparent that up to this point of rotation the inlet port 3 and the plug opening 13 will have not yet come in registration and consequently that no flow of fluid through the pipe 5 supplying cold water will take place. Upon still further rotation of the plug into the position shown in Fig. 12, it will be seen that port 3 and opening 13 will have arrived into partial registration. It will further be observed that by reason of the circumferential elongation of the opening 12, port 2 is still in maximum registration with said opening 12, near the central part of its length. In consequence fluid will flow simultaneously through both supply pipes; flowing in full volume, through the hot supply inlet, and in partial volume through the cold supply inlet. In Fig. 13 the position of the surfaces $p$ and $b$ are such that the left hand end of opening 13 will have arrived in registration in maximum relation with the inlet port 3; port 2 at the same time, by reason of the elongated form of opening 12, being in registration in maximum relation with the right hand end of said opening. In consequence of the simultaneous registration in maximum relation of inlet ports 2 and 3 respectively with plug openings 12 and 13, the fluid from both sources of supply will flow in equal volume through both said inlet ports and through said plug openings, and the flow through the valve will be at a maximum rate, as determined by the aggregate areas of the two inlet ports. In Fig. 14 the further rotation of the plug will operate to partly close the inlet port 2, inlet port 3, however, by reason of the circumferential elongation of opening 13 being diminished as to its opening. In Fig. 15 port 2 is entirely closed, port 3 being still in complete registration with the right hand end of opening 13. In consequence cold fluid alone will flow in full supply through the valve. On further rotation to the point indicated in Fig. 16 the port 13 is only open to a part of its area and the flow of cold supply will be correspondingly checked. In Fig. 17 both ports are completely closed and flow of fluid through the valve is entirely cut off.

From the above it is apparent that by the rotation of the plug 8 by means of the handle such an adjustment of the valve may be effected as will control the amount of flow of fluid either from the hot supply or of the cold supply separately or will permit such an intermingling of the two supplies as will bring about a discharge of the desired temperature. A still further control of the passage of fluid through the valve, by which more especially the rate of such flow may be regulated without affecting the proportions in which the supply is intermingled may be effected by longitudinally shifting the position of the plug in the valve body so as to change the position of the plug openings with reference to the inlet ports. Such longitudinal movement is preferably effected in the following manner. The controlling handle as more clearly shown in Figs. 2 and 7, is formed with forked portions $11^a$ preferably curved substantially as shown in the drawings, and arranged to straddle the tongue 9. Said forked portions $11^a$ are provided with external marginal rims $11^b$ which are adapted to slidingly engage within lateral grooves $10^b$ cut on the internal faces of a forked extension $10^a$ forming a part of the bushing 10. The tongue 9 is pivotally secured to said forked portions $11^a$ by a pin 17. Said pin 17 is located eccentrically with respect to the center of an arc to which the curvature of the ribs $11^b$ preferably conforms. Hence it is apparent that upon the rotation of the lever 11 in a vertical plane, an up and down displacement of pin 17 will take place, which, starting from the lowest position of the pin 17 as shown in Fig. 3, and corresponding to the normal position of lever 11, will reach its maximum upward displacement when the lever 11 is thrown over into its extreme limiting position as shown in Fig. 1. The plug 8, engaging said pin 17 through the tongue 9 will share in such longitudinal movement. The height of the inlet ports 2 and 3, and the width of the plug openings 12 and 13 and the longitudinal location of said openings upon the plug, are so related to the amount of the longitudinal travel of said plug, that such plug openings, although exactly registering as to their width with the height of the inlet openings, in the normal or lowest position of the plug, as shown in Fig. 3, will be displaced by the longitudinal movement of the plug until in the position of the plug corresponding to the maximum displacement of the same, said plug openings and said inlet ports are no longer in registration. Hence by swinging the control lever 11 in the vertical plane, the amount of the openings which are effective to permit the flow of fluid therethrough may be varied, irrespective of the position of the angular position of said handle $11^a$.

The manner in which the rate of flow through the valve is controlled by the manipulation of the control lever 11 is more clearly understood by reference to the developed views shown in Figs. 18, 19 and 20. In such figures, as before $b$ represents the surface of the valve body having the inlet ports 2 and 3 located therein and $p$ represents the surface of the plug having the plug openings 12 and 13 formed therein. In Fig. 18 the plug, in the position of rotation assumed in Fig. 11 is represented as shifted upwardly with respect to the valve surface $b$ for substantially one half the width of the valve opening. As in Fig. 11, only fluids supplied through the inlet port 2 will flow through the valve, but the rate of flow of such fluid will be substantially only half as great in Fig. 18 as in Fig. 11.

In Fig. 19 the angular position of the plug in the valve is supposed to be identical with that represented in Fig. 13 but the plug is assumed to have been so shifted longitudinally in the valve body as to nearly close the inlet ports. As in Fig. 13 fluid will flow in equal volume through both supply pipes through the valve. However, although the relative portions of fluid supplied from each pipe is the same, the rate of flow through the valve will be greatly diminished in comparison with that of Fig. 13. In Fig. 20 the plug, which is assumed to be in the angular position represented by Fig. 14 is assumed to have been shifted for about one third of the width of the inlet ports. The relative proportion of fluid flowing through each supply pipe will remain unaltered but the rate of such flow will be less in Fig. 20 than that shown in Fig. 14.

It is therefore apparent that my invention affords a means not only for adjusting the proportions in which supply fluids are intermingled, but also a means by which the rate of the intermingled fluids may be controlled without disturbance to proportions to the intermingled fluid.

While I have hereinabove described my invention as applied in its preferred form to a faucet controlling the flow of hot and cold water, it will be obvious that my invention may be applied in many modified forms without departure from the principles and the spirit of the invention, and for this reason I do not wish to be understood as limiting myself to the precise form and arrangement of the several parts exactly as hereinbefore set forth; nor do I wish to be understood as limiting myself to the employment of my invention in connection with a valve of any particular type nor for any special use, since it is evident that the invention is capable of adaptation to valves of different kinds and designed for different purposes.

Having described my invention what I claim and desire to secure by Letters Patent is,—

1. The combination, in a mixing valve, of a body having inlet ports and a discharge outlet; a plug mounted in said body with capacity for angular rotation and longitudinal movement therein, valve openings formed in said plug and adapted to simultaneously register in maximum relation with said inlet ports in one of the angular positions of the plug in said body, said openings extending partly around the plug in opposite directions from said registering portions, means for angularly rotating the plug in the body, and means for controlling the longitudinal position of the plug in the valve body irrespective of its angular position therein.

2. The combination in a mixing valve, of a valve body having a plurality of inlet ports and a discharge outlet; a plug angularly rotatable and longitudinally movable in said valve body, said plug having a plurality of plug openings adapted to register with said inlet ports in the course of the rotation of the plug in the body, and thereby to establish communication between said ports and said outlet, said openings embodying portions simultaneously registering with their coöperating inlet ports in one of the positions of rotation of the plug, said plug openings being circumferentially extended partly around the plug in opposite directions from said registering portions, means for angularly rotating said valve, and means for longitudinally shifting the plug in the valve body irrespective of its angular position therein.

3. The combination, in a mixing valve, of a valve body having a plurality of inlet ports and a discharge outlet; a plug mounted in said body with capacity for angular rotation and longitudinal movement therein, valve openings formed in said plug and having portions adapted to simultaneously register in maximum relation with said inlet ports in one of the angular positions of the plug in said body, said openings extending part way around the surface of the plug in opposite directions from said registering portions, said plug having a projecting end, a handle engaging said projecting end and adapted to angularly rotate said plug, said handle embodying a curved bearing surface, a bushing longitudinally fixed with reference to the valve body and rotating with the plug, said bushing being engaged by the said bearing surface, and a pivot pin connecting said handle to said projecting end said pin being eccentrically located with respect to said bearing surface.

4. The combination, in a mixing valve, of a valve body having a plurality of inlet ports and a discharge outlet, a plug mounted in said body with capacity for angular rotation and longitudinal movement therein, valve openings formed in said plug and having portions adapted to simultaneously register in maximum relation with said inlet ports in one of the angular positions of the plug in the said body, said openings extending part way around the surface of the plug in opposite directions from said registering portions, said plug having a projecting end, a handle attached to said projecting end by a pivot pin, said handle being angularly non-rotatable with respect to said plug, but being adapted to swing about said pin in a plane extending longitudinally with respect to said plug, said handle having a curved rib formed thereon, a bushing longitudinally fixed with reference to the valve body and adapted to rotate with the plug, a groove formed in said bushing and engaged by said rib, said pin being eccentrically located with respect to said bearing surface whereby a swinging movement of the handle about the pin causes a longitudinal movement of the plug in the valve body.

In testimony whereof I affix my signature in presence of two witnesses.

ARTHUR W. WEEDEN.

Witnesses:
NATHAN B. DAY,
CHAS. F. RANDALL.